United States Patent [19]

Weisbuch et al.

[11] Patent Number: 4,999,537
[45] Date of Patent: Mar. 12, 1991

[54] STRUCTURE OF ELECTRON SOURCE AND APPLICATION THEREOF TO ELECTROMAGNETIC WAVE EMITTING TUBES

[75] Inventors: Claude Weisbuch, Paris; Bernard Epsztein, Sceaux, both of France

[73] Assignee: Thomson-CSF, Puteaux, France

[21] Appl. No.: 374,781

[22] Filed: Jul. 3, 1989

[30] Foreign Application Priority Data

Jul. 5, 1988 [FR] France .................................. 88 09064

[51] Int. Cl.$^5$ .......................... H01J 1/30; H01J 23/04
[52] U.S. Cl. .................................... 313/311; 313/352; 313/353; 313/355
[58] Field of Search ........................ 307/88.5; 317/234; 330/65; 313/444, 310, 311, 352, 353, 355; 357/57

[56] References Cited

U.S. PATENT DOCUMENTS

| | | | |
|---|---|---|---|
| 2,960,659 | 11/1960 | Burton | 330/65 |
| 3,056,073 | 9/1962 | Mead | 317/234 |
| 3,334,248 | 8/1967 | Stratton | 307/88.5 |
| 3,447,045 | 5/1969 | Hickmott | 317/234 |

FOREIGN PATENT DOCUMENTS 0257460 3/1988 European Pat. Off. .

OTHER PUBLICATIONS

International Electron Devices Meeting, Dec., 1985, pp. 342-345, IEEE, M. Shrader et al.: "Pre-Bunched Beam Devices-Efficient Sources of UHF and Microwave Power".

*Primary Examiner*—Kenneth Wieder
*Attorney, Agent, or Firm*—Oblon, Spivak, McClelland, Maier & Neustadt

[57] ABSTRACT

The electron source disclosed comprises a solid having a first semiconductor layer capable of releasing electrons under the effect of an electrical field, means to make at least one of its faces partially transparent to at least one part of the released electrons, and to enable this part of the electrons to be ejected from the solid, and a second unstable composite semiconductor layer having a structure having a negative differential resistance located between the first layer and its face which is at least partially transparent, in contact with the first layer. The electron source further includes means to form, with said first layer and the composite layer, an electrical resonant cavity.

14 Claims, 1 Drawing Sheet

4,999,537

STRUCTURE OF ELECTRON SOURCE AND APPLICATION THEREOF TO ELECTROMAGNETIC WAVE EMITTING TUBES

BACKGROUND OF THE INVENTION

1. Field of the Invention

The present invention concerns the structure of electron sources and, by way of application, tubes for the emission of very high frequency and very high power electromagnetic waves.

2. Description of the Prior Art

In many fields, it is necessary to be able to produce electron beams, the energy of which is used to produce secondary phenomena, for example, the emission of electromagnetic waves. This is the case with microwave tubes which are commonly a part of the structure of electronic control systems, for example for radars.

At present, the source which produces an electron beam in tubes of this kind consists of a thermionic cathode heated notably by Joule effect. This technique enables the fairly easy production of the electrons with a desired density but it, nevertheless, has a drawback when it is necessary to modulate this electron density. For, to obtain this modulation, it becomes necessary to associate well known, ancillary electrodes with these cathodes which, to put it very schematically, consists of gates to which variable electrical potentials are applied. The performance performance characteristics of these sources are quickly limited once the frequency goes beyond 1 MHz, owing to the transit time.

Approaches have been proposed to try and overcome the above-mentioned drawbacks. One of them is the lasertron which uses the photoelectric effect. An incident laser pulse, modulated at the desired frequency, excites the current of electrons by photo-emission from a cathode having sound photo-emissive properties. This approach requires a laser modulated at very high frequency and a cathode having very stable photo-emissive properties. These conditions make a source of this type hardly usable in industry, because of its complexity and its high cost price.

In one approach, it has also been proposed to use a solid based on semiconductor materials, essentially formed by two layers of materials such as gallium arsenide with two different dopings between which an electrical voltage is applied. One of the two layers enables the release of a certain quantity of electrons which are then subjected to the electrical field created by the voltage. They are therefore accelerated and then fall on the second layer which enables their number to be greatly increased. When they have acquired sufficient energy, they are ejected from the solid, especially by the second layer, the extraction role of which is accentuated by the addition of a further layer on its external face, for example a layer of cesium or cesium oxide. This additional layer is aimed at lowering the electron affinity of the semiconductor, and all the electrons coming to this conduction zone can thus have enough energy to get extracted from the second layer, and hence from the solid.

However, this latter approach enables only an extraction of electrons that is continuously or modulated at low frequency, and it is still impossible to achieve quick modulation of the quantity of electrons ejected so as to obtain, notably in the case of electron sources for microwave tubes, successive electron packets enabling the creation of modulated electromagnetic waves.

It is an object of the present invention to overcome the above-mentioned drawbacks and to propose an electron source with a simple structure which can be used in many fields, such that its cost price makes it an industrial product for large-scale use and, above all, a structure which can deliver a quantity of electrons that can be very easily modulated.

SUMMARY OF THE INVENTION

More precisely, an object of the present invention is an electron source comprising a solid having a first semiconductor layer, capable of releasing electrons under the effect of an electrical field, and means to make at least one of its faces partially transparent to at least one part of said released electrons, and enabling this part of the electrons to be ejected from said solid, wherein the solid further has, between said first layer and the face which is at least partially transparent and is in contact with said first layer, a second unstable composite semiconductor layer having a structure with negative differential resistance, and wherein the electron source includes means to form, with said first layer and said composite second layer, an electrical resonant cavity.

Other features and advantages of the present invention will appear from the following description, made with reference to the appended drawings, which are given purely by way of illustration and in no way restrict the scope of the invention.

DETAILED DESCRIPTION OF THE INVENTION

Figure 1:
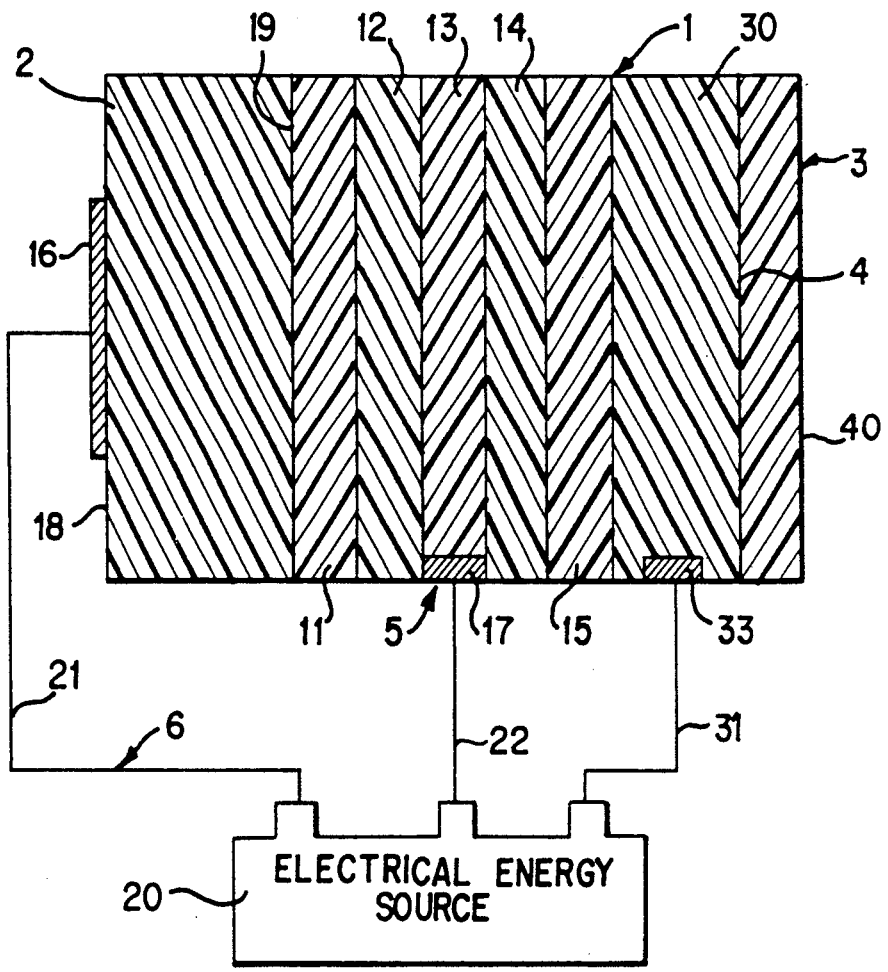
FIG. 1 shows an embodiment of an electron source according to the invention.

The electron source shown in FIG. 1 includes a solid 1 having a first semiconductor layer 2, capable of releasing electrons under the effect of an electrical field, and means 3 to make at least one of its faces 4 partially transparent to at least a portion of the released electrons, and to enable this portion of electrons to be ejected from the solid.

This solid further comprises, between the first layer 2 and the face 4, which is least partially transparent and is in contact with this first layer, a second composite semiconductor layer 5, which is unstable, having a structure with negative differential resistance. This source further has means 6 to form, with the first layer 2 and the second composite layer 5, an electrical resonant cavity.

The second stable composite semiconductor layer 5, having a negative differential resistance, has, for example, a resonant tunnel effect double barrier structure or a structure with an avalanche effect and transit time control which makes it possible, in dynamic mode, to give a differential resistance which leads to very high frequency current oscillations. These structures are advantageously formed, for example, by a stacking of a plurality of secondary layers of semiconductor materials of the $p^+$ type. As illustrated, this plurality of secondary layers is advantageously equal to five, namely 11, 12, 13, 14 and 15. In this case, the five secondary layers are respectively formed, for the first order layer 11, third order layer 13 and fifth order layer 15, by gallium arsenide and for the second order layer 12 and the fourth order layer 14, by gallium alumino-arsenide.

In the example given, the first layer 2 is made of gallium arsenide with a thickness of about 1000 to 10,000 angstroms and the five secondary layers 11-15 have a thickness of the order of 50 angstroms each.

As mentioned above, the source has means 6 to form, with the first layer and the composite layer, an electrical resonant cavity. These means have, for example, two electrodes 16, 17, respectively located, firstly, on the face 18 of the first layer 2 opposite that layer 19 which is in contact with the composite layer 5 and, secondly, on this composite layer for example on the above-defined secondary third order layer 13. These two electrodes 16, 17, are capable of being joined to an electrical energy source 20 to close the electrical resonant cavity. As an example, the electrical potential applied between these two electrodes 16, 17, is about 1.5 volts.

These electrodes are formed, for example, by deposits of conducting materials known per se, essentially based on gold, nickel, germanium or titanium to which there are solidly joined electrical conductors 21, 22, capable of being connected to the electrical power source 20.

Figure 2:
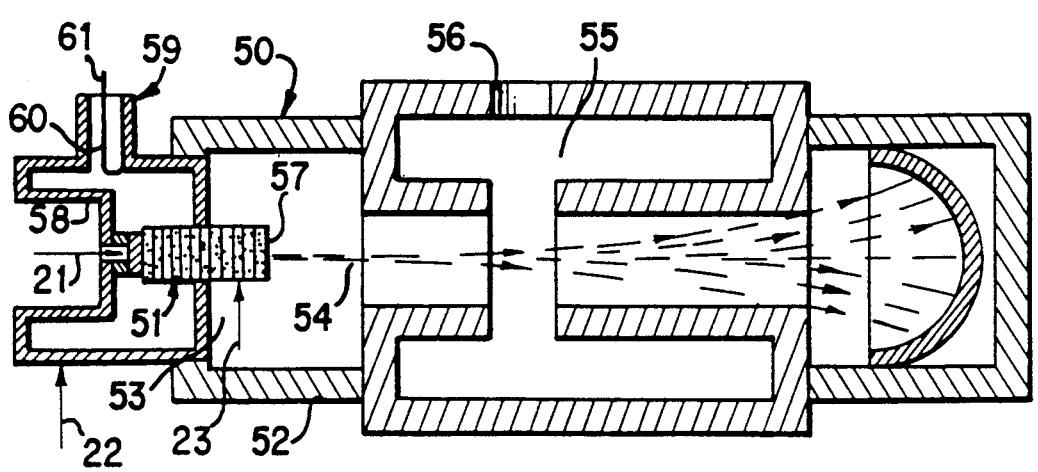
FIG. 2 shows an example of an application of a source according to the invention as an electron emitting cathode in a microwave tube.

A mechanical resonant cavity, as shown in FIG. 2, which shall be described hereinafter, may be associated with the preceding electrical resonant cavity.

To make it possible to advantageously eject a high density of electrons, the solid 1 further has a third layer 30 of semiconductor material arranged in contact with a second composite layer 5, and the electron source then has means 31 to apply an electrical field between the composite layer 5 and this third layer 30, to produce an amplification of the number of electrons by avalanche effect using electrons released at the first layer 3 and the second layer 5.

This third layer 30 is an n+ type semiconductor layer of, for example, gallium arsenide. In the exemplary embodiment given, the electrical field enabling the amplifying avalanche is given by an electrical voltage applied between the electrode 17, placed on the above-defined secondary third order layer 13 and a third electrode 33 located on the third layer, the value of this voltage being about 3 volts.

As mentioned above, the solid has at least one face 4, which is partially transparent to the electrons released in its mass. The transparency of this face is given by a fourth layer 40 of material having negative electron affinity, deposited on that face of the third layer 30 which is substantially opposite the face in contact with the second layer 5. This fourth layer 40 is, for example, made of a cesium-based material such as cesium oxide.

It is quite clear that it is possible to make an electron source, according to the invention, having several parallel-mounted solids, with the same structure as that described above, to obtain an electron-emitting surface of a given value, depending on the needs of the application of this source.

The above-described electron source works as follows:

When the solid 1, with the above-defined structure, is subjected to the electron releasing potential, in fact to a low direct voltage, for example of 1.5 volts, electrons are released in the first layer 2 and accelerated towards the second layer 5. Since this layer is unstable, it forms an oscillating source for the releasing of electrons by tunnel effect, which is well known per se. The electrons reach the output of this second composite layer in a density which is modulated as a function of the value of the resonance frequency of the electrical cavity formed and can be subjected to determined variations.

When these successive "packets" of electrons reach the output face of the second layer, they fall on the third layer 30 and, as mentioned above, their number is amplified by the avalanche effect created by the voltage of about 3 volts applied between the face of the third layer 30, opposite the layer common with the second layer 5, and one layer 13 of the secondary layers of this second layer. The electrons thus released and accelerated may be ejected from the solid, all the more so as they reach the fourth layer 40, for example made of cesium oxide, the role of which is to reduce the electron affinity of the semiconductor which, even in the case of p type gallium arsenide, becomes negative. All the electrons which go into this conduction zone may thus have sufficient energy to get removed from this layer and hence, from the solid.

The emitted electrons can thus be used for any application, notably and very advantageously as an electron-emitting "cathode" in a microwave tube. For, it is very easy, notably by modulating the value of the voltages applied, to be able to modulate, at the same frequency and in the same form, the electron packets removed from the solid by its face having the above-defined partial transparency.

FIG. 2 gives a schematic view of a microwave tube 50 using a "cathode" 51 of this type, as defined and described with respect, notably, to FIG. 1.

This tube has, in a vacuum chamber 52, the above-described electron source 51, the partially transparent emissive face 57 of which is pointed towards the interior 53 of the chamber and the emitting direction 54 of which is substantially tangential to the input aperture 55 of an antenna anode 56 to which a high electrical potential, for example equal to 10 kilovolts, is applied, thus enabling the electron pulses emitted after having been accelerated to be converted, in a known way, into microwave type electromagnetic waves such as those used, for example, in supply circuits for radars or similar equipment.

In this embodiment, the source 51 further has a mechanical resonant cavity 58 provided with a coupling means 59, notably a loop 60 by which the end 61 of a coaxial cable is terminated, thus enabling the microwave tube 50 to be synchronized with an external source.

What is claimed is:

1. An electron source comprising:
   a solid having at least one face and a first semiconductor layer capable of releasing electrons under the effect of an electrical field,
   means for making said at least one of face of said solid partially transparent to at least one part of said released electrons, and for enabling said at least one part of said released electrons to be ejected from said solid,
   an unstable, composite second semiconductor layer between said first layer and said at least one face said second layer being in contact with said first layer, and having a structure with negative differential resistance, and
   means for forming, with said first layer and said composite second semiconductor layer, an electrical resonant cavity.

2. An electron source according to claim 1, wherein said second semiconductor layer having a negative differential resistance is chosen from among resonant tunnel effect dual barrier structures and structures with avalanche effect and transit time control.

3. An electron source according to claim 2, wherein said structure of said second semiconductor layer is formed by a stacking of a plurality of secondary layers of $p^+$ type semiconductor materials.

4. An electron source according to claim 3, wherein five secondary layers are provided which respectively include first, second, third, fourth and five order layers.

5. An electron source according to claim 4, wherein the five secondary layers are respectively formed, for the first order, third order and fifth order layers, by gallium arsenide, and for the second order and fourth order layers, by gallium alumino-arsenide.

6. An electron source according to claim 5, wherein said means for making said at least one face of said solid partially transparent is formed by a fourth layer of material with negative electron affinity deposited on said at least one face of the solid before being made transparent.

7. An electron source according to claim 6, wherein said layer of material with negative electron affinity is formed by a cesium-based material.

8. An electron source according to claim 6, wherein said first layer is formed by an $n^+$ type semiconductor material.

9. An electron source according to claim 8, wherein said $n^+$ type semiconductor material is gallium arsenide.

10. An electron source according to claim 9, wherein said solid further comprises a third layer of semiconductor material placed in contact with said second layer and wherein said source comprises means to apply, between said second and third layers, a voltage for amplification, by avalanche effect, of the number of electrons released from said first and second layers.

11. An electron source according to claim 10, wherein said third layer is an $n^+$ type semiconducting layer.

12. An electron source according to claim 11, wherein said third layer is formed by gallium arsenide.

13. An electron-emitting cathode for a microwave tube including an electron source comprising:
a solid having at least one face and a first semiconductor layer capable of releasing electrons under the effect of an electrical field,
means for making said at least one of face of said solid partially transparent to at least one part of said released electrons, and for enabling said at least one part of said released electrons to be ejected from said solid,
an unstable, composite second semiconductor layer between said first layer and said at least one face, said second layer being in contact with said first layer, and having a structure with negative differential resistance, and
means for forming, with said first layer and said composite second semiconductor layer, an electrical resonant cavity.

14. An electron-emitting cathode for a microwave tube according to claim 13, comprising a plurality of parallel-mounted solids.

* * * * *